United States Patent
Withrow et al.

(10) Patent No.: US 7,623,953 B2
(45) Date of Patent: Nov. 24, 2009

(54) INTEGRATED REGENERATION AND ENGINE CONTROLS

(75) Inventors: Michael Paul Withrow, Peoria, IL (US); Ryan Edward Graham, Peoria, IL (US); Timothy William Grunow, II, East Peoria, IL (US); Arvil Duane Wilson, Pekin, IL (US); Andrew Alfred Knitt, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 12 days.

(21) Appl. No.: 11/147,435

(22) Filed: Jun. 8, 2005

(65) Prior Publication Data

US 2006/0282213 A1 Dec. 14, 2006

(51) Int. Cl.
*G06F 19/00* (2006.01)
*F01N 3/00* (2006.01)

(52) U.S. Cl. ........................ 701/101; 701/109; 701/114; 60/285

(58) Field of Classification Search ......... 701/101–103, 701/115, 114, 109; 60/277, 284, 285
See application file for complete search history.

(56) References Cited

U.S. PATENT DOCUMENTS

| | | | |
|---|---|---|---|
| 5,426,936 A | 6/1995 | Levendis et al. | |
| 5,826,428 A * | 10/1998 | Blaschke | 60/303 |
| 6,062,331 A * | 5/2000 | Grunow et al. | 180/268 |
| 6,484,496 B2 | 11/2002 | Le Tallec et al. | |
| 6,519,935 B2 | 2/2003 | Weigl | |
| 6,637,196 B1 | 10/2003 | Tost | |
| 6,694,242 B2 * | 2/2004 | Wong | 701/104 |
| 6,722,120 B2 | 4/2004 | Plote | |
| 6,760,659 B1 | 7/2004 | Cowen | |
| 6,769,246 B2 | 8/2004 | Strohmaier et al. | |
| 7,131,320 B2 * | 11/2006 | Weinowski et al. | 73/114.75 |
| 7,296,562 B2 * | 11/2007 | Withrow et al. | 123/559.1 |
| 2003/0121249 A1 * | 7/2003 | Foster et al. | 60/285 |
| 2003/0163587 A1 | 8/2003 | Knight et al. | |
| 2003/0200022 A1 * | 10/2003 | Streichsbier et al. | 701/108 |
| 2004/0055284 A1 | 3/2004 | Ripper et al. | |
| 2004/0118108 A1 | 6/2004 | Ripper et al. | |
| 2004/0159098 A1 | 8/2004 | Gui et al. | |
| 2004/0211159 A1 | 10/2004 | Hamahata et al. | |
| 2004/0237513 A1 | 12/2004 | Bunting et al. | |
| 2005/0000210 A1 | 1/2005 | Smaling et al. | |
| 2005/0044843 A1 * | 3/2005 | Price | 60/285 |
| 2005/0120158 A1 | 6/2005 | McClure et al. | |
| 2005/0207936 A1 * | 9/2005 | Berryhill et al. | 422/63 |

(Continued)

OTHER PUBLICATIONS

SAE "Surface Vehicle Recommended Practice," J1939-21, published Apr. 2001.

(Continued)

*Primary Examiner*—John T Kwon
(74) *Attorney, Agent, or Firm*—Finnegan, Henderson, Farabow, Garrett & Dunner

(57) ABSTRACT

A method to integrate engine and exhaust aftertreatment control may include connecting an engine controller to an aftertreatment controller using a common data link protocol to provide a bidirectional data flow between the engine controller and the aftertreatment controller. The method may also include connecting the engine controller to one or more engine components. The method may also include connecting the aftertreatment controller to one or more aftertreatment components.

23 Claims, 5 Drawing Sheets

U.S. PATENT DOCUMENTS

2005/0287034 A1* 12/2005 Wills et al. .................... 422/52
2007/0000241 A1* 1/2007 Funke et al. .................. 60/295
2007/0022746 A1* 2/2007 Decou et al. .................. 60/295
2007/0151230 A1* 7/2007 Withrow et al. ............... 60/285
2008/0018442 A1* 1/2008 Knitt .......................... 340/438

OTHER PUBLICATIONS

SAE "Surface Vehicle Recommended Practice," J1939, published Jan. 2005.

* cited by examiner

INTEGRATED REGENERATION AND ENGINE CONTROLS

TECHNICAL FIELD

The present disclosure is directed to integrating controls, and in particular, to systems and methods for connecting an engine controller and an aftertreatment controller using one or more data link protocols.

BACKGROUND

Engines have used electronic engine controllers for many years to perform various functions related to the engine. For example, they may be used to reduce "knocking" in engines. "Knocking" is uncontrolled fuel combustion detrimental to emissions, fuel economy, and engine longevity. In addition, they may also be used to control valves in an engine for fuel injection control. Thus, electronic engine controllers are an important component of engine-driven machines.

Engines, including diesel engines, gasoline engines, natural gas engines, and other engines in the art, may exhaust air pollutants. The air pollutants may be composed of both gaseous materials and solid particulate matter. Particulate matter may include carbon particles called soot. In addition, particulate matter may contain ash, a material that can be used in engine oils to reduce the acidity of the oil.

The particulate matter generated by an engine may be filtered from an exhaust stream. Various technologies may be used to filter particulate matter from an exhaust stream. One of these technologies includes the use of an exhaust element, such as a particulate filter. Particulate filters trap particles in the exhaust stream, so the exhaust stream is cleaner when it enters the air.

Particulate matter trapped by the filter can accumulate in the filter and reduce the operating efficiency of the engine. As particulate matter in the filter accumulates, the back pressure to the engine can increase. Therefore, the engine may consume more fuel to produce the same amount of power as compared to an engine with a filter free of particulates.

These and other problems may be avoided by periodic cleaning of the filter. Various methods of cleaning filters exist in the art. One method includes heating the particulate matter trapped in the filter to a temperature at which it combusts or vaporizes. This type of filter cleaning may be referred to as regeneration. Various regeneration techniques may be used to regenerate a particulate filter. One technique involves the use of a diesel burner that may be used to heat the particulate matter trapped in the filter.

The regeneration process may be controlled by an aftertreatment controller to help control and improve the efficiency of the regeneration process. For example, the controller may improve efficiency by controlling the amount of fuel used for regeneration. To control the amount of fuel used for regeneration, the controller may be configured to determine the amount of particulate matter that needs to be heated and only cause the usage of an amount of fuel that is actually required to heat the particulate matter.

It may be helpful to connect the engine controller to the aftertreatment controller. This interconnection may enable the engine controller to share information with the aftertreatment controller. This information may assist the aftertreatment controller to control the regeneration process efficiently. In addition, this interconnection may also enable the aftertreatment controller to share information with the engine controller. This information may assist a user to troubleshoot problems with the aftertreatment controller more efficiently.

Various systems have been proposed where information is exchanged between an engine control unit and an aftertreatment control unit. One such system is disclosed in U.S. Patent Application Publication No. US 2004/0211159 A1 to Hamahata et al ("the '159 publication"), which published on Oct. 28, 2004. This publication describes an apparatus where a filter control unit sends a signal to the engine control unit after determining that the filter control unit needs to regenerate the filter. In response to this signal, the engine control unit modifies engine operation to elevate the exhaust gas temperature for regeneration of the filter. The engine control unit also sends a signal to the filter control unit that contains a temperature differential value. The filter control unit determines the time to stop regeneration based on this value. Thus, the exchange of these signals helps the regeneration of the filter.

While the apparatus of the '159 publication may be used to control the regeneration of a filter, the apparatus has several shortcomings. The apparatus does not use any data link protocols for communication between the filter control unit and the engine control unit. Therefore, as known in the art, a separate connection between the filter control unit and the engine control unit is required for each signal sent between the two units. Therefore, because the apparatus of the '159 publication does not use a data link protocol for the communication between the filter control unit and the engine control unit, the apparatus would require an additional connection between the filter control unit and the engine control unit for each additional signal that would need to be exchanged between the two units. As the number of signals that need to be exchanged between the filter control unit and engine control unit increases, the number of connections between the two units would have to be increased by the same number. However, it may not be practical to increase the number of wires between the filter control unit and engine control unit because of space and cost considerations.

This limitation would limit the number of signals that may be exchanged between the filter control unit and the engine control unit in the '159 apparatus. As shown in the '159 publication, the availability of only two connections between the engine control unit and the filter control unit may only permit the passage of the two signals (temperature differential value and regeneration signal) between them. These signals may not provide the filter control unit enough information to control the regeneration process effectively and efficiently. For example, the filter control unit has no information about the operating conditions of the engine. Lack of this information may cause the filter unit to use more or less fuel for regeneration than necessary, thus affecting fuel efficiency. The filter control unit may also not be able to send a signal indicating its operational status to the engine control unit. This lack of information being sent from the filter control unit to the engine control unit may reduce the diagnostic measures available for troubleshooting any regeneration related problems because there may be no indication of a malfunction in the regeneration apparatus.

The present disclosure is directed to overcoming one or more of the problems associated with the prior art regeneration method.

SUMMARY OF THE INVENTION

One aspect of the present disclosure includes a method to integrate engine and exhaust aftertreatment control. The method may include connecting an engine controller to an aftertreatment controller using a common data link protocol to provide a bidirectional data flow between the engine controller and the aftertreatment controller. The method may also include connecting the engine controller to one or more engine components. The method may also include connecting the aftertreatment controller to one or more aftertreatment components.

Another aspect of the present disclosure includes an exhaust aftertreatment control system. The system may include an engine controller. The system may also include an aftertreatment controller connected to the engine controller using a common data link protocol to provide a bidirectional data flow between the engine controller and the aftertreatment controller. In addition, the system may include one or more engine components operably connected to the engine controller. The system may also include one or more aftertreatment components operably connected to the aftertreatment controller.

Yet another aspect of the disclosure includes a work machine. The work machine may include a frame and an engine operably connected to the frame. The work machine may also include an aftertreatment controller. The engine controller may be connected to the aftertreatment controller using a common data link protocol to provide bidirectional data flow between the engine controller and the aftertreatment controller. The work machine may also include one or more engine components connected to the engine controller. The work machine may further include one or more aftertreatment components connected to the aftertreatment controller.

DETAILED DESCRIPTION

Figure 1:
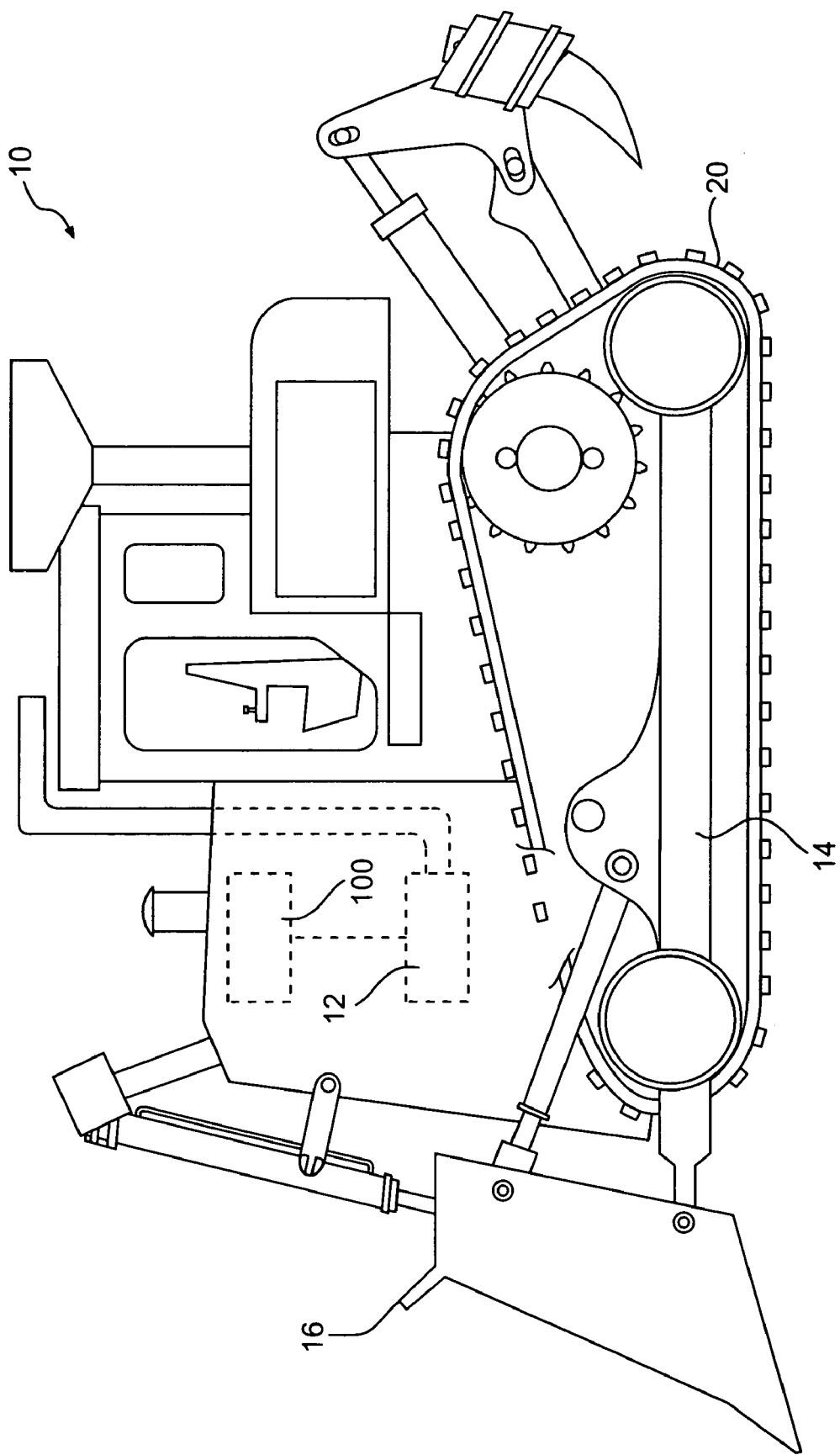
FIG. 1 is a pictorial representation of a work machine according to an exemplary disclosed embodiment.

FIG. 1 provides a pictorial illustration of a work machine 10. Work machine 10 may include engine 12. Work machine 10 may also include a frame 14 and a work implement 16. Engine 12 may be operably connected to an exhaust aftertreatment control system 100. Engine 12 may include a diesel engine, a gasoline engine, or any other power-producing device. Work machine 10 may also include a traction device 20.

While work machine 10 is shown as a track type tractor, work machine 10 may include various types of machines. For example, work machine 10 may be a truck, wheeled tractor, dump truck, automobile, on-highway vehicle, off-highway vehicle, skid-steer, stationary generator, air compressor or any other device that includes an engine that generates an exhaust stream.

Figure 2:
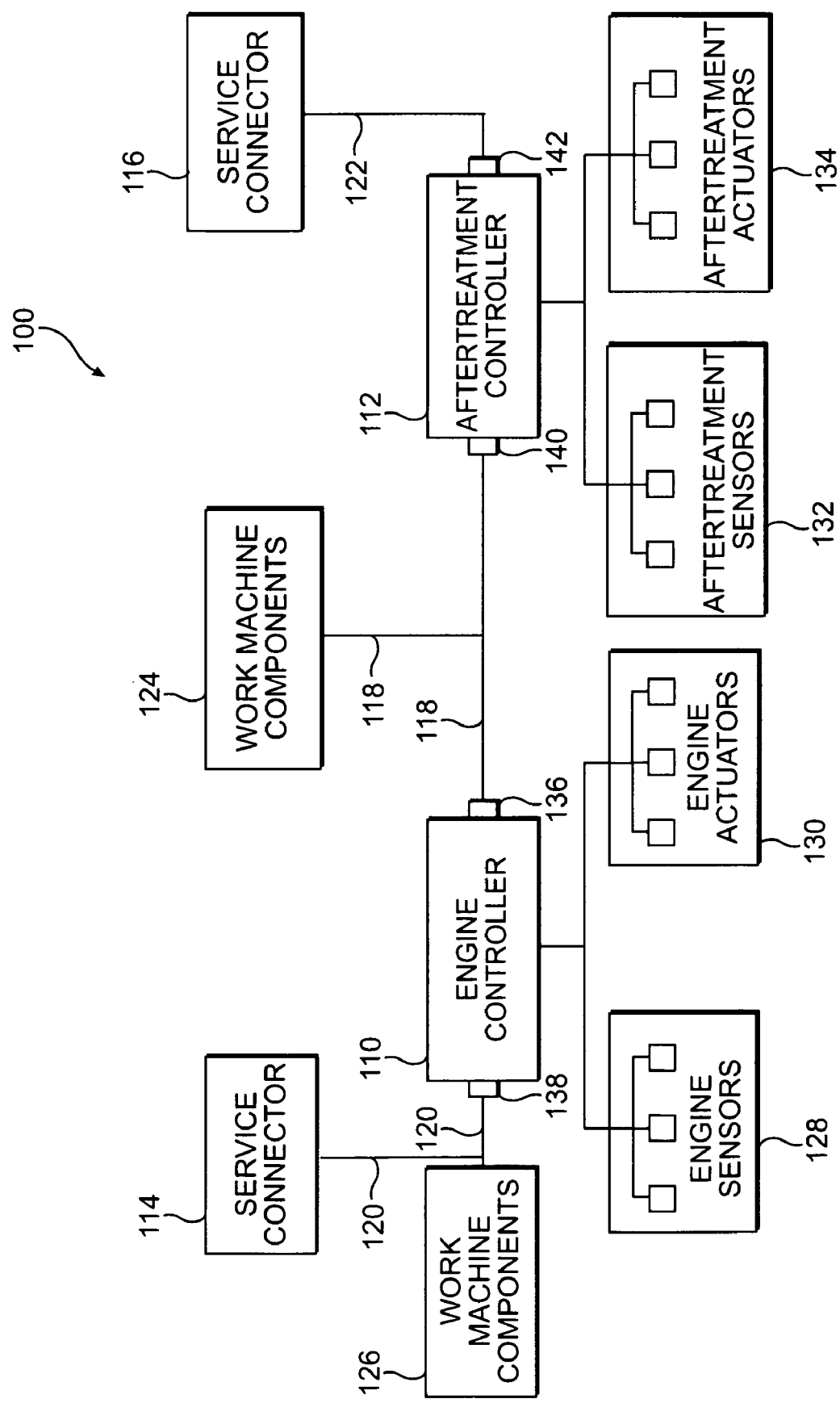
FIG. 2 is block diagram of a regeneration system according to an exemplary disclosed embodiment.

FIG. 2 provides a block diagram representation of an exhaust aftertreatment control system 100 according to an exemplary disclosed embodiment. System 100 may include an engine controller 110 and an aftertreatment controller 112. The system may also include service connectors 114 and 116 and data links 118, 120, and 122. The system may further include work machine components 124 and 126, engine sensors 128, engine actuators 130, aftertreatment sensors 132, and aftertreatment actuators 134. In addition, engine controller 110 may include a first data link port 136 and a second data link port 138. Similarly, aftertreatment controller 112 may include a first data link port 140 and a second data link port 142.

Engine controller 110 may be operably connected to aftertreatment controller 112 with one of data links 118, 120, or 122. Data links 118, 120, or 122 may be used to transfer bidirectional data between engine controller 110 and aftertreatment controller 112. Any data link protocol (e.g., J1939, SAEJ1587) may operate over data links 118, 120, and 122 to transfer information over these links. In addition, engine controller 110 may be operably connected to one or more work machine components 126 using a data link 118, 120 or 122. Engine controller 110 may also be operably connected to engine sensors 128 and engine actuators 130 to control the operation of engine 12. Aftertreatment controller 112 may operably connect to work machine components 124 with data links 118, 120 or 122. Aftertreatment controller 112 may also be operably connected to aftertreatment sensors 132 and aftertreatment actuators 134 to help the regeneration of an exhaust element (not shown). Engine controller 110 and aftertreatment controller 112 may be operably connected to one or more service connectors 114 and 116. These service connectors may be used for troubleshooting purposes or other activities requiring access to engine controller 110 and aftertreatment controller 112.

Engine controller 110 may include devices suitable for running a software application. For example, engine controller 110 may include a CPU, RAM, I/O modules etc. In one embodiment, engine controller 110 may constitute a unit dedicated for controlling the operation of engine 12. Engine controller 110 may be used to control various operations of engine 12 and work machine 10. As discussed above, engine controller 110 may be configured to help reduce engine knock. In addition engine controller 110 may be configured to control fuel injection in engine 12 using one or more valves (not shown). Furthermore, engine controller 110 may be configured to monitor the fuel level in the fuel tank of work machine 10. Engine controller 110 may also help monitor and control the regeneration of an exhaust element of work machine 10 and perform any other function known in the art.

Like engine controller 110, aftertreatment controller 112 may also include components suitable for running a software application (CPU, RAM, I/O modules etc.). Aftertreatment controller 112 may be used to control regeneration of an exhaust element. For example, aftertreatment controller 112 may control regeneration of a particulate trap (not shown) or any other such element. Aftertreatment controller 112 may be configured to perform various functions for regeneration. For example, aftertreatment controller 112 may be configured to determine the time to commence regeneration and the time to stop regeneration. In addition, aftertreatment controller 112 may be configured to initiate regeneration and stop regeneration. Furthermore, aftertreatment controller 112 may be configured to control the regeneration process during regeneration. For example, aftertreatment controller 112 may be configured to maintain flame stability (in case of a diesel fuel burner), control the exhaust temperature, and other such parameters.

Engine controller 110 and aftertreatment controller 112 may be operably connected to each other using a common data link 118, 120 or 122. As noted above, data link protocols such as standard SAE protocols like J1939 and SAE J1587 and also proprietary data link protocols such as Caterpillar data link protocol may operate on data link 118, 120 and 122. The use of data link protocols may be beneficial because engine controller 110 and aftertreatment controller 112 may be able to exchange a large amount of information between each other because of the use of these data link protocols without the need for a separate connection for each signal being exchanged between them. This information may be used to control the regeneration process and also help the troubleshooting of various components in work machine 10.

In one embodiment, as shown in FIG. 2, engine controller 110 and aftertreatment controller 112 are operably connected to each other using data link 118. Engine controller 110 may send data to aftertreatment controller 112 using data link 118. This data may enable controller 112 to control the regeneration process. For example, in one embodiment, engine controller 110 may send data including engine operating conditions to aftertreatment controller 112. Specifically, information such as mass flow rate, exhaust temperature, engine speed and engine load may be sent from engine controller 110 to aftertreatment controller 112. Furthermore, aftertreatment controller 112 may send diagnostic messages back to engine controller 110.

Figure 3:
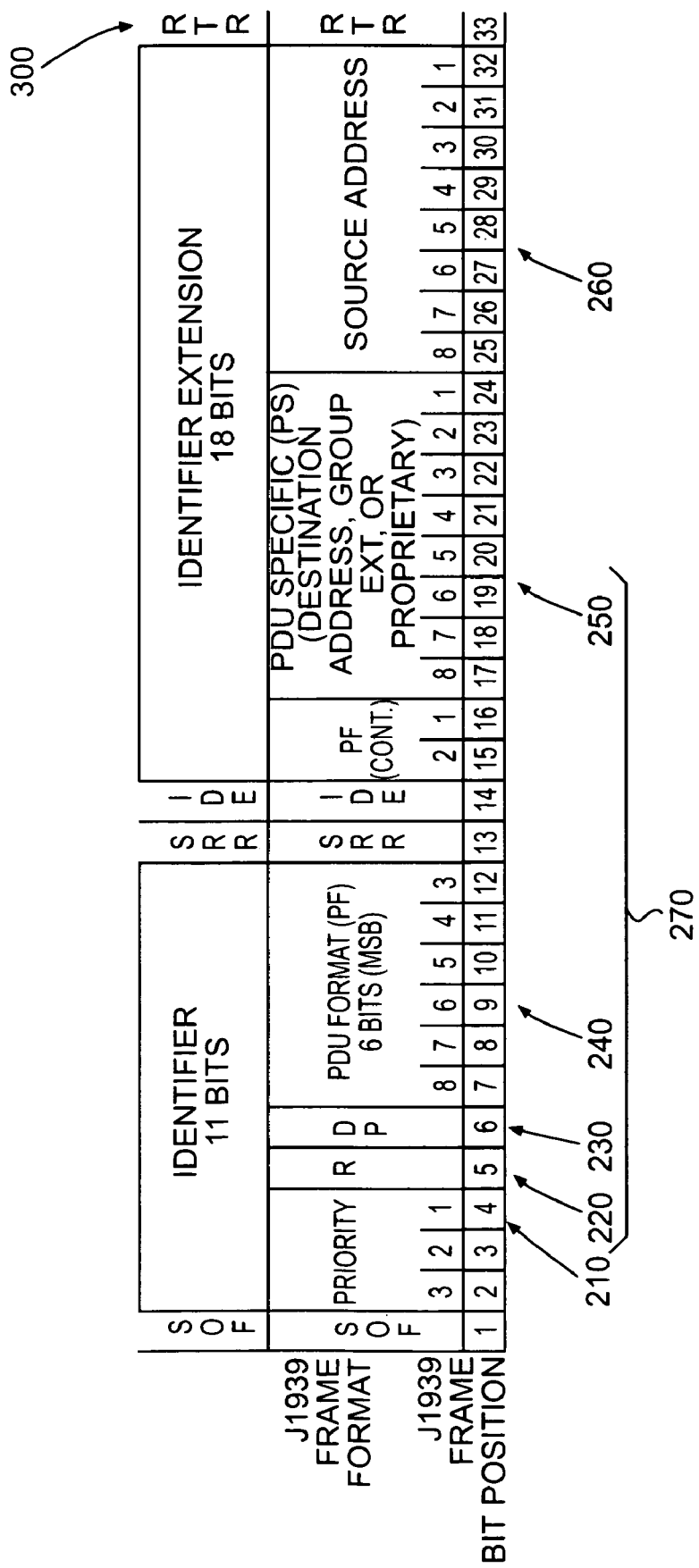
FIG. 3 represents a datalink protocol frame according to an exemplary disclosed embodiment.

FIG. 3 represents a J1939 datalink protocol frame 300. It should be noted that J1939 is structured to operate at different layers of the Open System Interconnect ("OSI") model. The disclosed embodiment uses the J1939 protocol operating at the datalink layer of the OSI model. J1939 uses the Control Area network ("CAN") protocol which permits any controller in a work machine to transmit data on the network. As shown in FIG. 3, the J1939 datalink protocol frame 300 includes a 29 bit identifier. The identifier includes a priority field 210. The identifier also includes a reserved field ("R") 220, a Data Page ("DP") field 230, a Protocol Data Unit ("PDU") format field ("PF") 240, a PDU Specific field ("PS") 250 and a source address field 260. Collectively, R 220, DP 230, PF 240 and PS 250 form the Parameter Group ("PG") 270 being transmitted.

The priority field 210 helps determine the priority of a message during transmission. Messages with high priority may be transmitted with lower latency as compared to a messages with low priority. For example, a high priority message such as a torque control message from a transmission to engine 12 may be given priority over a low priority message such as a configuration message for engine 12.

R 220 is reserved for future use. DP 230 is used as a page selector. DP 230 set to 0 includes all the messages currently defined. If set to 1, DP 230 provides additional expansion capacity for future use. PF 240 defines the type of PDU used. PS 250 depends on the value of PF 240. If the value of PF 240 is between 0 and 239 (i.e., PDU1 is being used), then PS 250 includes a destination address for the message being transmitted. If the value of PF 240 is between 240 and 255 (i.e., PDU2 is being used), then PS 250 includes a value that identifies a message that may be broadcast to all engine controllers on the network. Source address field 260 includes the address of the controller sending the message.

Collectively, R 220, DP 230, PF 240 and PS 250 form PG 270 being transmitted. PG 270 is identified by a Parameter Group Number ("PGN"). A PGN uniquely identifies each parameter group. Thus, standard messages have a predefined parameter group number. For example, engine gas flow rate has a PGN of 61450. Engine Controller 110 identification information has a PGN of 64965. In addition, other PGNs may be used to define other standard messages. Furthermore, a new PGN may be used to define a non-standard message.

Figure 4:
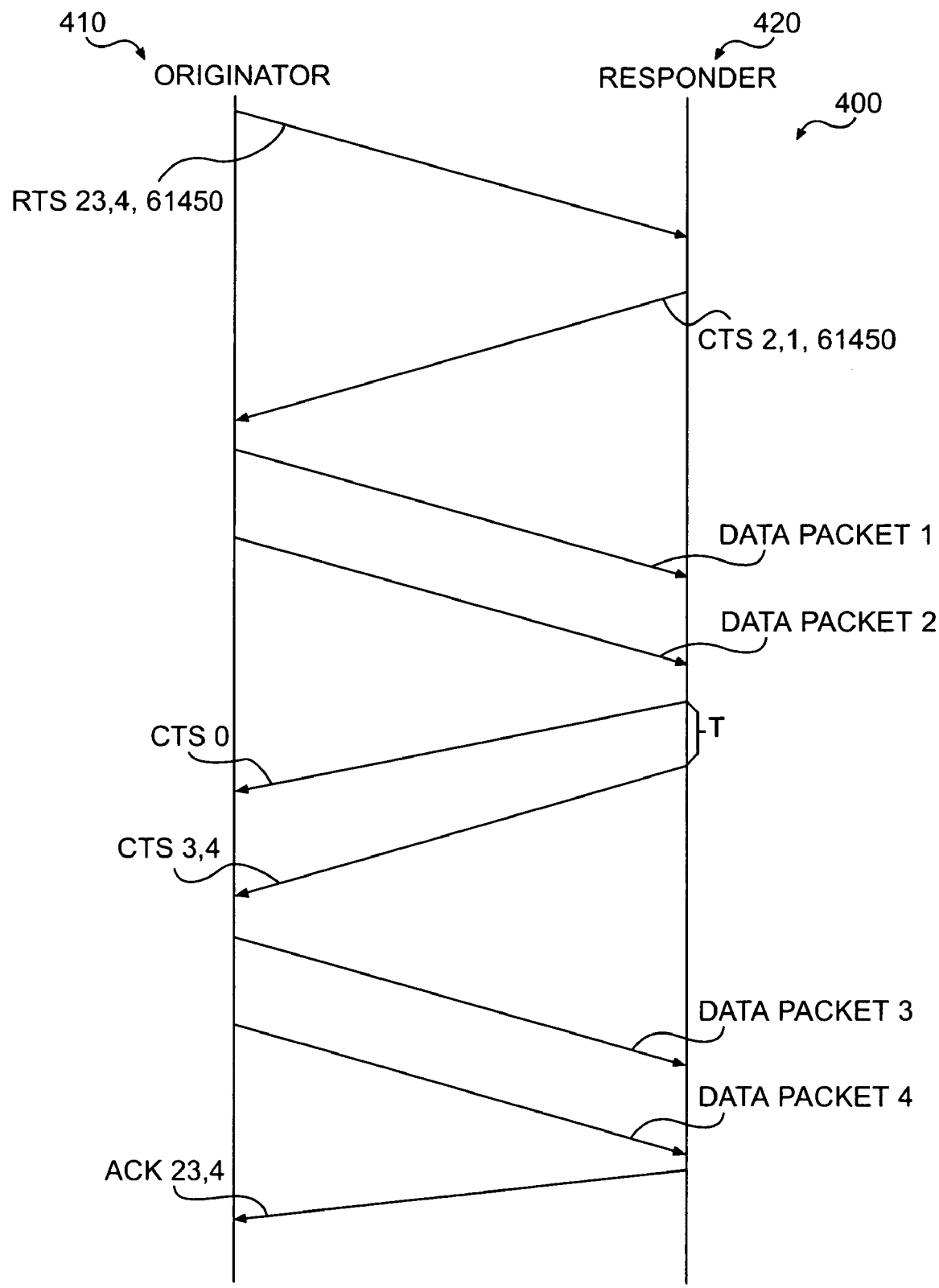
FIG. 4 represents a flow model for data transfer according to an exemplary disclosed embodiment.

FIG. 4 represents an exemplary flow model 400 for data transfer. The originator 410 sends a "request to send" (RTS) to the responder 420 indicating that there are 23 bytes in the packeted message which will be transferred in four packets. The PGN for the data in the transfer is 61450 i.e., engine gas flow rate. Responder 420 replies with a "clear to send" (CTS) that is ready to process two packets beginning with packet 1. Originator 410 sends the first two packets. Responder 420 then sends a "clear to send" indicating that it wants to hold the connection open but cannot receive any packets right now. A maximum of T seconds later, responder 420 sends another "clear to send" message indicating that it can take two more packets beginning with packet 3. Once packets 3 and 4 have been transferred, responder 420 transmits an "acknowledgement" (ACK) message indicating that all the packets expected were transmitted and the connection is now considered closed.

Figure 5:
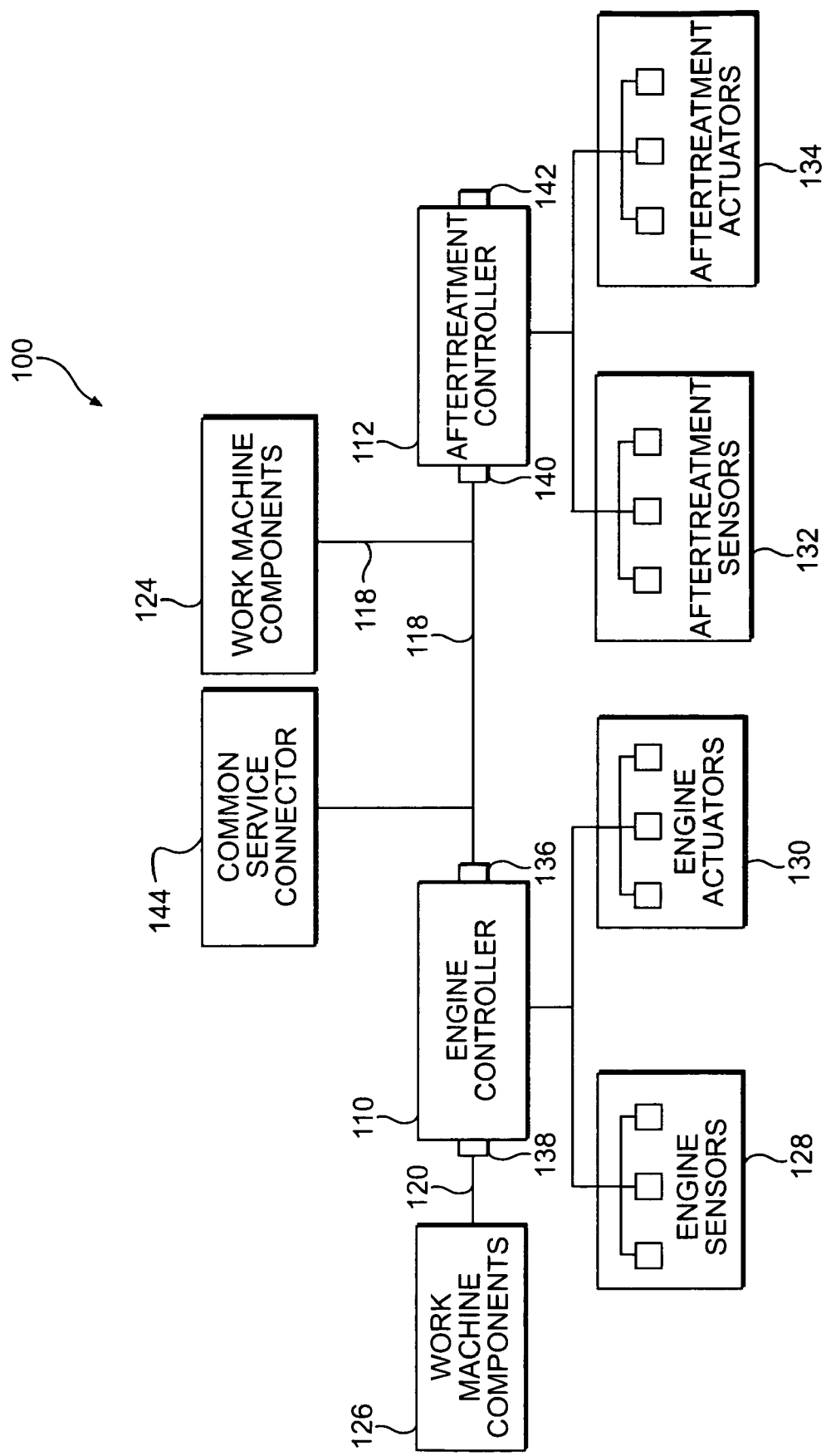
FIG. 5 is a block diagram of a regeneration system according to another exemplary disclosed embodiment.

As seen in FIG. 4, different data may be sent on the same link with the use of a unique PGN for each kind of data. Furthermore, the use of RTS, CTS, and ACK signals ensure that data is not lost during its transfer from one component to another. Each datalink port (136, 138, 140 and 142 as shown in FIGS. 2 and 5) may be configured with a transmit component and receive component (not shown) to ensure that transmit data is sent on the transmit port and receive data is received on the receive port. Each data link protocol may be further configured to transmit and receive data over copper wires, fiber optic cables or any other appropriate medium. It should be noted that the data flow shown in FIG. 4 is exemplary only. Other appropriate data flow models may be used depending on the application.

Returning to FIG. 2, data sent from engine controller 110 to aftertreatment controller 112 may allow aftertreatment controller 112 to control the regeneration process. For example, data sent by engine controller 110, that includes the mass flow rate and exhaust temperature, when received by aftertreatment controller 112, may allow aftertreatment controller 112 to determine the temperature differential to which it needs to heat the exhaust gas in order to burn particulate matter in the exhaust element. In addition, data including the mass flow rate may allow aftertreatment controller 112 to determine the amount of oxygen it needs to inject in the exhaust gas to maintain a desired air-to-fuel ratio in the exhaust element (not shown). Thus, aftertreatment controller 112 may control the regeneration process with the information provided by engine controller 110 through data link protocols operating over data links 118, 120 and 122.

Aftertreatment controller 112 may send data containing diagnostic information to engine controller 110. This diagnostic information received by engine controller 110 may cause certain indicators (not shown) to indicate failure conditions. For example, if one of aftertreatment sensors 132 connected to or included in aftertreatment controller 112 fails, a signal sent by aftertreatment controller 112 to engine controller 110 may cause, for example, an amber light (not shown) operably connected to engine controller 110 to light up. Additionally, if particulate matter accumulation in an exhaust element increases above a predetermined threshold, aftertreatment controller 112 may send a signal to engine controller 110 that may cause, for example, a red light (not shown) operably connected to engine controller 110 to light up. Furthermore, if the pressure differential across an exhaust element exceeds a predetermined threshold, a signal sent by aftertreatment controller 112 to engine controller 110 may cause yet another indicator (not shown) operably connected to engine controller 110 to light up.

Conversely, the pressure differential across an exhaust element or a particulate matter accumulation in an exhaust element may go below a predetermined threshold level if an exhaust element is damaged or missing. Under this condition, aftertreatment controller 112 may be configured to send a signal to engine controller 110 causing yet another light (not shown) operably connected to engine controller 110 to light up. Thus, various indicators operably connected to engine controller 110 that are triggered in response to signals sent by aftertreatment controller 112 may assist a user to troubleshoot problems that may occur in the aftertreatment system.

Engine controller 110 and aftertreatment controller 112 may operably connect to a number of devices used for operation of work machine 10. For example, as shown in FIG. 2, engine controller 110 may operably connect to work machine components 126, engine sensors 128, and engine actuators 130. In addition, aftertreatment controller 112, as shown in FIG. 2, may be operably connected to machine components 124, aftertreatment sensors 132, and aftertreatment actuators 134. Furthermore, engine controller 110 and aftertreatment controller may connect to any other devices suitable for control of engine 12 and the regeneration of any exhaust element (not shown).

Engine controller 110 and aftertreatment controller 112 may be configured to communicate with devices using different means of communication. For example, engine controller 110 and aftertreatment controller 112 may be configured to communicate with engine sensors 128 and aftertreatment sensors 132 respectively, using pulse width modulation, a 0-5V analog signal or any data link protocol. Furthermore, engine controller 110 and aftertreatment controller 112 may be configured to communicate with engine actuators 130 and aftertreatment actuators 134, respectively, using pulse width modulation, any data link protocol or a current signal. In addition, any other method of communication known in the art may be used to enable engine controller 110 and aftertreatment 112 to communicate with devices operably connected to them.

Engine controller 110 may be operably connected to engine actuators 130. Engine actuators 130 may be configured to respond to signals sent by engine controller 110 to control the operation of engine 12. Specifically, pneumatically driven actuators such as air cylinders may be used to aid fuel combustion. In addition, electric actuators, hydraulic actuators or any other actuators may be used to perform various other functions in engine 12. Engine actuators 130 may also include other types of actuators known in the art that may be configured to control the operation of engine 12.

Engine controller 110 may be operably connected to engine sensors 128. Engine sensors may be configured to sense a variety of parameters related to the operation of engine 12. For example, engine sensors 128 may be used to measure the mass flow rate in engine 12 and send a corresponding signal to the engine controller 110. The mass flow rate may include the fuel flow rate and the air flow rate in engine 12. In addition, engine sensors 128 may also be configured to measure the fuel level in the fuel tank and any other such measurement and send an appropriate signal back to engine controller 110. Engine sensors 128 may also be configured to measure any other parameters known in the art. Engine sensors 128 may include electronic sensors, mechanical sensors, or any other sensors known in the art.

Engine controller 110 may also be connected to other work machine components 126 besides engine sensors 128 and engine actuators 130. Work machine components 130 may include a steering wheel (not shown), transmission valves, or other such components known in the art.

Aftertreatment controller 112 may be operably connected to aftertreatment sensors 132. Aftertreatment sensors 132 may be configured to perform various functions. For example, aftertreatment sensors 132 may be configured to measure the temperature of the exhaust gas in an exhaust element. In addition, aftertreatment sensors 132 may also be configured to measure the pressure differential across an exhaust element. Aftertreatment sensors 132 may also be configured to measure other such parameters known in the art Aftertreatment sensors may include electronic sensors, mechanical sensors or any other sensors known in the art.

Aftertreatment controller 112 may be operably connected to aftertreatment actuators 134. Aftertreatment actuators 134 may be configured to aid the regeneration process. For example, aftertreatment actuator 134 may be configured to pump oxygen in an exhaust element (not shown) that it is configured to regenerate in order to maintain a desired air-to-fuel ratio in the exhaust element. In addition, aftertreatment actuators 134 may be configured to perform any other regeneration function known in the art. Pneumatic actuators, hydraulic actuators, electric actuators, or any other such devices may be used as aftertreatment actuators 134.

Aftertreatment controller 112 may also be connected to other work machine components 124 besides aftertreatment sensors 132 and aftertreatment actuators 134. Work machine components 134 may include an exhaust manifold, tail pipe (not shown), or other such components known in the art.

Engine controller 110 and aftertreatment controller 112 may connect to one or more service connectors 114 and 116. In one embodiment, service connectors 114 and 116 may include a plastic plug or receptacle into which a service technician may connect a diagnostic tool. In one embodiment, the diagnostic tool may be a data link device. The data link device may be a hand held or portable computing device to read diagnostic information from engine controller 110 and aftertreatment controller 112.

Engine controller 110 and aftertreatment controller 112 may be connected to service connectors 114 and 116 in different configurations. In one embodiment, as shown in FIG. 5, the two controllers may be connected to a common service connector 144 shared by engine controller 110 and aftertreatment controller 112. In an alternative embodiment, as shown in FIG. 2, engine controller 110 may be operably connected to service connector 114 and aftertreatment controller 112 may be operably connected to service connector 116, wherein each service connector is separate from the other. Engine controller 110 and aftertreatment controller 112 may use a data link protocol to communicate with their respective service connectors (114 and 116) or with their common service connector 144. For example, in the exemplary embodiment, as shown in FIG. 3, engine controller 110 and aftertreatment controller 112 may use a common data link protocol to communicate with the common service connector 144. In yet another embodiment, where each service connector is separate, as shown in FIG. 2, engine controller 110 may use a first data link protocol to communicate with service connector 114 and aftertreatment controller 112 may use a second data link protocol to communicate with service connector 116.

Engine controller 110 and aftertreatment controller 112 may be configured with a number of data link ports for communication purposes. A data link port is a communications port configured to enable transmission of information over it using one or more data link protocols. For example, in an exemplary embodiment, engine controller 110 may be configured with a first data link port 136 for communication with aftertreatment controller 112 and with a second data link port 138 for communication with service connector 114 and work machine component 126. Similarly, aftertreatment controller 112 may be configured with a first data link port 140 for communication with engine controller 110 and work machine component 124 and with a second data link port 142 for communication with service connector 116.

Each data link port 136, 138, 140, and 142 may be configured to operate with one or more data link protocols. For example, in an exemplary embodiment, data link port 138 on engine controller may be configured to operate with a first data link protocol. On the other hand, data link port 136 on engine controller 110 and data link port 140 on aftertreatment controller 112 may be configured to operate with a second data link protocol. Furthermore, data link port 142 on aftertreatment controller 112 may be configured to operate with a third data link protocol.

INDUSTRIAL APPLICABILITY

The disclosed method of integrating a regeneration control unit with an engine control unit may be used in any system that includes an engine that generates an exhaust stream and includes a system for regenerating an exhaust element. This method may be used on vehicles such as cars, trucks, track type tractors, on-highway vehicles, off-highway vehicles and also on stationary devices such as stationary power generators and air compressors.

By providing for the engine controller to communicate with an aftertreatment controller with a common data link protocol, the disclosed method may help dispense with the need to have a separate connection for each signal exchanged between the engine controller and the aftertreatment controller. This is because multiple signals may be sent on the same connection through the use of a data link protocol over that connection. Therefore, fewer wires may be used to send more data between the two controllers. In contrast, as in some prior art systems, a separate connection may be necessary for each signal sent between the engine controller and the aftertreatment controller, leading to the use of a large number of wires between the controllers. The use of fewer wires in the disclosed method may help simplify wire routing, thus reducing wiring complexity. In addition, the disclosed method may also help reduce wiring costs as less wire may be used. Furthermore, the disclosed method may help increase the ease of troubleshooting because of the reduction in the amount of wiring. Moreover, the reduction in wiring may also reduce the cost and time of manufacturing the regeneration system because fewer wires may have to be routed between the two systems. In addition, the use of fewer wires may help reduce the amount of space needed to connect the two controllers, thereby reducing the overall size of the regeneration system.

Use of data link protocols for communication between the two controllers may also increase the amount of data that may be exchanged between the two controllers. Data sent by the engine controller to the aftertreatment controller may help the aftertreatment controller control the regeneration process, thereby leading to many benefits such as better fuel efficiency. Data sent by the aftertreatment controller to the engine controller may help identify problems with the aftertreatment system, which may help simplify the troubleshooting process in case of a failure in the aftertreatment system.

It will be apparent to those skilled in the art that various modifications and variations can be made in the disclosed method to integrate a regeneration control unit with an engine control unit without departing from the scope of the disclosure. Additionally, other embodiments of the disclosed method will be apparent to those skilled in the art from consideration of the specification. It is intended that the specification and the examples be considered exemplary only, with a true scope of the disclosure being indicated by the following claims and their equivalents.

What is claimed is:

1. A method to integrate engine and exhaust aftertreatment control, comprising:
    connecting an engine controller to an aftertreatment controller using a common data link protocol to provide a bidirectional data flow between the engine controller and the aftertreatment controller;
    transmitting messages between the aftertreatment controller and the engine controller via the common data link;
    determining a priority of the messages to be transmitted;
    transmitting a message having a high priority with a lower latency compared to a message with a low priority;
    connecting the engine controller to one or more engine components; and
    connecting the aftertreatment controller to one or more aftertreatment components.

2. The method of claim 1, further including connecting the engine controller and the aftertreatment controller to a common service connector shared by the engine controller and the aftertreatment controller.

3. The method of claim 1, further including connecting the engine controller to a first service connector and connecting the aftertreatment controller to a second service connector separate from the first service connector.

4. The method of claim 1, further including connecting the engine controller to engine components including at least one of an engine sensor and an engine actuator and connecting the aftertreatment controller to aftertreatment components including at least one of an aftertreatment sensor and an aftertreatment actuator.

5. The method of claim 4, wherein the engine controller and the aftertreatment controller operably connect to the engine components and aftertreatment components, respectively, via at least one of pulse width modulation, data link protocols, current signals and analog signals.

6. The method of claim 1, wherein the common data link protocol includes at least one of J1939 and SAE J1587 data link protocols.

7. The method of claim 1, wherein the bidirectional data flow includes one or more engine operating conditions and one or more aftertreatment diagnostic conditions.

8. The method of claim 7, wherein the one or more engine operating conditions include at least one of mass flow rate, an exhaust temperature, engine speed and engine torque.

9. The method of claim 7, wherein the one or more aftertreatment diagnostic conditions include at least one of a particulate matter accumulation level in an exhaust element and a pressure differential across the exhaust element.

10. An exhaust aftertreatment control system comprising:
    an engine controller;
    an aftertreatment controller connected to the engine controller using a common data link protocol to provide a bidirectional data flow between the engine controller and the aftertreatment controller, aftertreatment controller configured to maintain flame stability of a diesel burner;
    one or more engine components operably connected to the engine controller; and
    one or more aftertreatment components operably connected to the aftertreatment controller.

11. The control system of claim 10, wherein the engine controller and the aftertreatment controller are operably connected to a common service connector shared by the engine controller and the aftertreatment controller.

12. The control system of claim 10, wherein the engine controller is connected to a first service connector and the aftertreatment controller is connected to a second service connector separate from the first service connector.

13. The control system of claim 10, wherein the one or more engine components include at least one of an engine sensor and an engine actuator, and the one or more aftertreatment components include at least one of an aftertreatment sensor and an aftertreatment actuator.

14. The control system of claim 10, wherein the engine controller and the aftertreatment controller operably connect to the engine components and aftertreatment components, respectively, via at least one of pulse width modulation, data link protocols, current signals and analog signals.

15. The control system of claim 10 wherein the common data link protocol includes at least one of J1939 and SAE J1587 data link protocols.

16. The control system of claim 10, wherein the bidirectional data flow includes one or more engine operating conditions and one or more aftertreatment diagnostic conditions.

17. The control system of claim 16, wherein the one or more engine operating conditions include at least one of a mass flow rate, an exhaust temperature, engine speed and engine torque.

18. The control system of claim 16, wherein the one or more aftertreatment diagnostic conditions include at least one of a particulate matter accumulation level in an exhaust element and a pressure differential across the exhaust element.

19. A machine comprising:
a frame;
an engine operably connected to the frame;
an aftertreatment controller;
an engine controller connected to the aftertreatment controller using a common data link protocol to provide bidirectional data flow between the engine controller and the aftertreatment controller, the aftertreatment controller configured to maintain flame stability of a diesel burner;
the common data link including a priority field configured to determine a priority of messages to be transmitted and transmitting a message with a high priority with a lower latency compared to a message with a low priority;
one or more engine components connected to the engine controller; and
one or more aftertreatment components connected to the aftertreatment controller.

20. The work machine of claim 19, wherein the engine controller and the aftertreatment controller connect to a common service connector shared by the engine controller and the aftertreatment controller.

21. The work machine of claim 19, wherein the engine controller is connected to a first service connector and the aftertreatment controller is connected to a second service connector separate from the first service connector.

22. The work machine of claim 21, wherein the common data link protocol includes at least one of J1939 and SAE J1587 data link protocols.

23. The work machine of claim 21, wherein the bidirectional flow includes one or more engine operating conditions and one or more aftertreatment diagnostic conditions.

* * * * *